(12) United States Patent
Yamasaki et al.

(10) Patent No.: US 7,787,417 B2
(45) Date of Patent: Aug. 31, 2010

(54) RADIO COMMUNICATION SYSTEM

(75) Inventors: Hidetoshi Yamasaki, Hyogo (JP); Kenji Miyanaga, Osaka (JP); Hitoshi Takai, Osaka (JP); Koichiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 456 days.

(21) Appl. No.: 11/631,291

(22) PCT Filed: Jul. 5, 2005

(86) PCT No.: PCT/JP2005/012376

§ 371 (c)(1),
(2), (4) Date: Apr. 1, 2008

(87) PCT Pub. No.: WO2006/004103

PCT Pub. Date: Jan. 12, 2006

(65) Prior Publication Data

US 2008/0198799 A1    Aug. 21, 2008

(30) Foreign Application Priority Data

Jul. 6, 2004    (JP) .............................. 2004-199137

(51) Int. Cl.
H04B 7/26    (2006.01)
(52) U.S. Cl. ...................... 370/329; 455/446
(58) Field of Classification Search ................. 370/329; 455/446
See application file for complete search history.

(56) References Cited

U.S. PATENT DOCUMENTS

2004/0180650 A1    9/2004  Kamemura et al.
2004/0180698 A1    9/2004  Kamemura et al.

FOREIGN PATENT DOCUMENTS

| EP | 1 059 737 | 12/2000 |
| EP | 1768279 A1 * | 3/2007 |
| JP | 3067751 | 5/2000 |
| JP | 2002-111579 | 4/2002 |
| JP | 2002-300105 | 10/2002 |

OTHER PUBLICATIONS

H. Takai et al., "A DSRC System Proposal Extended From ARIB STD-T75 Using Distributed Antenna and PSK-VP Scheme", ITST2002, pp. 239-244, Nov. 2002.

\* cited by examiner

*Primary Examiner*—Melvin Marcelo
(74) *Attorney, Agent, or Firm*—Wenderoth, Lind & Ponack, L.L.P.

(57) ABSTRACT

In a wireless communication system using the contention method, collisions between transmission signals sent from terminals to a base station are avoided, and a communication area is flexibly formed while suppressing unnecessary radiation of the communication area. The base station includes antennas disposed such that wireless zones cover mutually different areas, wireless units connected to the antennas in one-to-one correspondence, and for, via the respective antennas, receiving wireless signals from the terminal stations in the wireless zones and transmitting wireless signals to the terminal stations in the wireless zones, a data processing unit for processing the wireless signals received by the plurality of wireless units and generate data to be transmitted to the terminal stations, and a communication control unit for controlling the wireless units so as to, during a slot other than a transmission request slot, form one communication area combining the wireless zones of all of the antennas, and during the transmission request slot, form mutually independent communication areas less than or equal in number to the antennas.

10 Claims, 10 Drawing Sheets

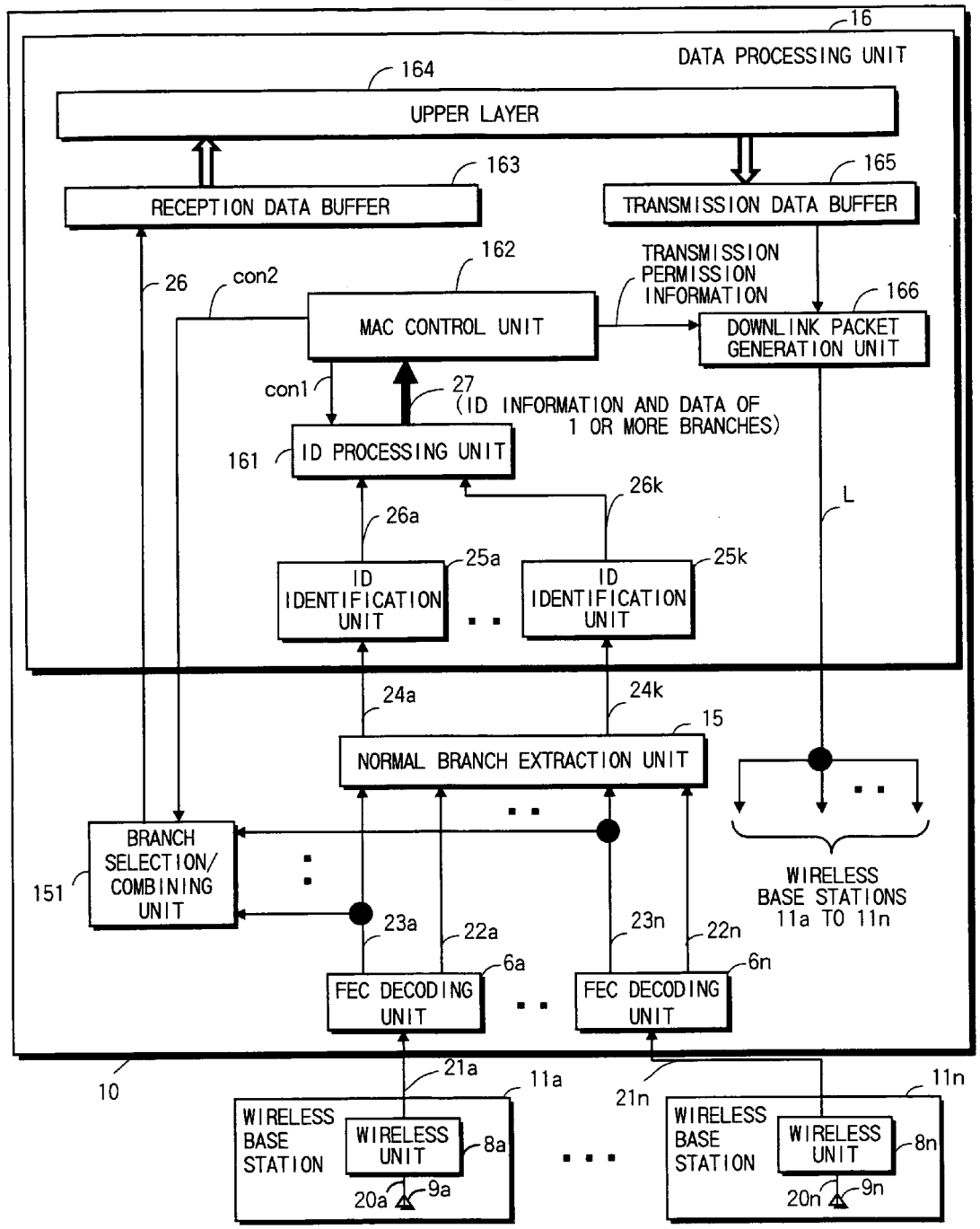

EXEMPLARY STRUCTURE OF ARIB STD-T75 BASIC FRAME

ACTS FORMAT

ACTC FORMAT

RADIO COMMUNICATION SYSTEM

TECHNICAL FIELD

The present invention relates to a wireless communication system that performs wireless communication between a base station and a terminal station, using a contention method such as slotted Aloha.

BACKGROUND ART

In wireless communication systems, space division multiple access (SDMA) has been actively considered in recent years as a technology for improving efficiency in the use of frequency, which is a limited resource. SDMA is a technology for using an adaptive array antenna 102 as shown in FIG. 9 to create beams having directivity toward terminals, and dividing a communication area using a single frequency into two or more wireless zones. SDMA technology makes it possible to avoid collisions between wireless signals transmitted and received between terminals 2a to 2c and a base station 101 even when using a contention method such as slotted Aloha to perform communication therebetween, thereby enabling two or more terminals to communicate with a base station at the same time on the same frequency channel.

Document 1, for example, discloses a method of further lowering the probability of failures in establishing a channel due to collisions between transmission signals when two or more terminals request the base station to establish a channel, by using an adaptive array antenna to dynamically control the directivity of the antenna.

On the other hand, "A DSRC System Proposal Extended From ARIB STD-T75 using Distributed Antenna and PSK-VP Scheme," by H. Takai et al., ITST2002, pp. 239-244, November 2002, and Japanese Patent No. 3067751, for example, disclose road-to-vehicle communication systems that use a so-called distributed antenna technique in which antennas, each forming a wireless zone in a different area, are provided on the base station side, and transmit and receive the same data at substantially the same time on the same frequency to form an extended communication area.

In such road-to-vehicle communication systems, so-called diversity reception is used to perform selection/combining on signals received by two or more base station antennas based on error information in decoded data strings, reception levels, etc.

Patent document 1: Japanese Patent Application Publication No. 2002-300105

Non-patent document 2: "A DSRC System Proposal Extended From ARIB STD-T75 using Distributed Antenna and PSK-VP Scheme," by H. Takai et al., ITST2002, pp. 239-244, November 2002

Patent document 3: Japanese Patent No. 3067751

DISCLOSURE OF THE INVENTION

Problems Solved by the Invention

However, an adaptive array antenna includes two or more antenna elements provided in proximity with each other, and is used in a space division multiplex scheme which controls the weighting of signals from the antenna elements to give the antenna directivity. Communication areas are therefore divided by forming beams in two or more directions from a single site where the array antenna is located, thereby making it difficult to flexibly form communication areas. Conventional space division multiplex systems that use adaptive array antennas are unsuitable for wireless communication systems such as the road-to-vehicle communication system for forming an elongated communication area along a road as shown in FIG. 10. This is because when using a conventional space division multiplex system, the further away wireless zones are formed from the base station 101, the more the wireless zones spread outside the desired communication area, as shown in FIG. 10. In such a case, unrelated terminals outside the communication area receive unnecessary information, which may cause disruptions.

On the other hand, in the road-to-vehicle communication system using the so-called distributed antenna technique disclosed in document 2, identical information signals are transmitted at the same time from two or more antennas of the base station, and so-called diversity reception performs selection/combining on signals received by two or more base station antennas based on error information in decoded data strings, reception levels, etc., for processing. Since there are two or more antennas but only one communication area is formed in this road-to-vehicle communication system, if transmission requests are received at substantially the same time from two or more in-vehicle stations in the wireless zones of different antennas, only one of the requests from one of the in-vehicle stations is accepted, and the other in-vehicle station that sent the other transmission request is ignored.

Although two or more in-vehicle stations traveling in the same wireless zone of a certain antenna will not often send transmission requests at the same time, such a situation would be expected if a communication system using multiple antennas to cover a wider area along a highly-traveled road were constructed. In such a case, it is rational to receive the transmission requests from the two or more in-vehicle stations and grant transmission permissions as long as there are free communication slots. The technology disclosed in document 2 cannot handle such a case.

The present invention solves the problems in the aforementioned conventional technology, and provides a wireless communication system able to, in a case of performing communication by a contention method, avoid collisions between wireless signals in order to perform communication between two or more terminals and a base station at the same time on the same frequency channel, as well as suppress unnecessary radiation out of the communication area, and configure the communication area more flexibly than when using a conventional space division multiplex method.

Means to Solve the Problems

In order to solve the above problem, a first invention is a wireless communication system for performing communication between a base station and a plurality of terminal stations by using a contention method to assign a different slot in response to a transmission request from each of the terminal stations, the base station including: a plurality of antennas disposed such that a plurality of wireless zones cover mutually different areas; a plurality of wireless units connected to the plurality of antennas in one-to-one correspondence, and being operable to, via the respective antennas, receive wireless signals from the terminal stations in the wireless zones, and transmit wireless signals to the terminal stations in the wireless zones; a data processing unit operable to process the wireless signals received by the plurality of wireless units, as well as generate data to be transmitted to the plurality of terminal stations; and a communication control unit operable to control the plurality of wireless units so as to, during a slot other than a transmission request slot, form one communication area combining the wireless zones of all of the antennas, and during the transmission request slot, form a plurality of mutually independent communication areas less than or equal in number to the plurality of antennas.

EFFECTS OF THE INVENTION

According to the above-described first invention, one communication area combining the wireless zones of all of the antennas is formed in slots other than a transmission request slot, whereby one terminal performs communication in one slot. On the other hand, the same number of or fewer mutually independent communication areas than the number of antennas are formed in the transmission request slot, whereby the same number of terminal stations as the communication areas can perform communication at the same time without collisions.

Furthermore, the communication areas can be formed more flexibly than with conventional methods. For example, disposing antennas that form their own wireless zones at different positions along a road to divide a communication area makes, it possible to configure an elongated communication area along the road while suppressing unnecessary radiation out of the communication area.

Here, the wireless zones of the antennas may each form a single independent communication area during the transmission request slot. Separating the communication areas of each of the antennas makes it possible to simultaneously receive transmission requests from a maximum number of terminal stations.

The data processing unit may include a judgment subunit operable to, if a plurality of the transmission requests are received from a plurality of terminal stations at substantially the same time during the transmission request slot, judge whether the plurality of transmission requests have been normally received; and a permission information generation subunit operable to, if the judgment subunit has judged that the plurality of transmission requests have been normally received, generate transmission permission information addressed to the plurality of terminal stations, and the transmission permission information may be transmitted in a downlink control slot assigned by the base station Also, if a plurality of communication slots are available, the base station may assign each of the communication slots to a different one of the plurality of terminal stations, and transmit, to the plurality of terminal stations, transmission permission information regarding the assignment of the communication slots.

Given that it is possible to receive transmission requests from two or more terminal stations, assigning free slots, if available, to the terminals and transmitting transmission permission information regarding the slot assignment enables the two or more terminal stations that performed transmission requests to immediately begin communication from the next basic frame, which is rational.

BRIEF DESCRIPTION OF THE DRAWINGS

FIG. 2 is a block diagram showing a relevant structure of a base station pertaining to embodiment 1 of the present invention;

DESCRIPTION OF THE CHARACTERS

Figure 1:
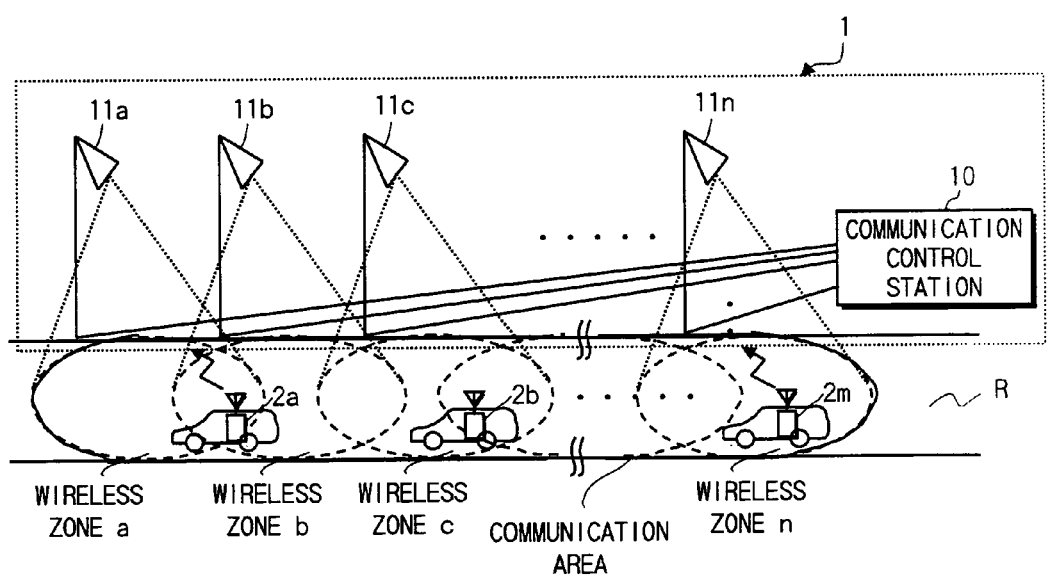
FIG. 1 is a conceptual diagram showing an exemplary structure of a wireless communication system to which the present invention is applied.

1, 101 base station
2$a$ to 2$m$ in-vehicle station
6$a$ to 6$n$ FEC decoding unit
8$a$ to 8$n$ wireless unit
9$a$ to 9$n$ antenna
10 communication control station
11$a$ to 11$n$ wireless base station
14 control unit
15 normal branch extraction unit
16 data processing unit
20$a$ to 20$n$ wireless reception signal
21$a$ to 21$n$ detected data string
22$a$ to 22$n$ error detection result
23$a$ to 23$n$ decoded data string
24$a$ to 24$n$ output data string
151 branch selection/combining unit
161 ID processing unit
162 MAC control unit

BEST MODE FOR CARRYING OUT THE INVENTION

An embodiment of the present invention is described below with reference to the drawings.

Embodiment 1

Overall Structure

FIG. 1 is a conceptual diagram showing a structure of a road-to-vehicle communication system, which is an exemplary wireless communication system including a base station 1 to which embodiment 1 of the present invention has been applied. In FIG. 1, the base station 1 is composed of a single communication control station 10 and wireless base stations 11$a$ to 11$n$. As shown in FIG. 2, the wireless base stations 11$a$ to 11$n$ are composed of wireless units 8$a$ to 8$n$ and antennas 9$a$ to 9$n$ respectively connected thereto.

The wireless base stations 11$a$ to 11$n$ are disposed at different positions along a road R so as to form wireless zones a to n. As shown in FIG. 2, portions of adjacent wireless zones a to n overlap each other.

The communication control station 10 controls all of the wireless base stations 11$a$ to 11$n$, and performs both communication and the establishment of communication with in-vehicle stations through uplink and downlink slots. Details of the communication control are described later.

Note that although the road-to-vehicle communication system of the present embodiment employs a so-called slot-assign system in which communication slots are assigned from the base station to in-vehicle stations for performing communication, slotted Aloha is used as a medium access system in transmission request slots, whereby any of in-vehicle stations 2a to 2m can request the base station to assign a communication slot (perform a transmission request).

Structure of the Base Station

FIG. 2 shows an overall structure of the base station. The communication control station 10 is composed of a data processing unit 16, a normal branch extraction unit 15, a branch selection/combining unit 151, and FEC (Forward Error Correction) decoding units 6a to 6n. The FEC decoding units 6a to 6n are connected to the wireless base stations 11a to 11n in one-to-one correspondence. Note that the wireless base stations 11a to 11n are connected to not only the FEC decoding units 6a to 6n, but also to a downlink packet generation unit 166 in the data processing unit 16. Unlike the former connection, the latter connection is a parallel connection between the single downlink packet generation unit 166 and all of the wireless base stations 11a to 11n.

Optical fiber or the like is used for both the uplink and downlink connections between the communication control station 10 and the wireless base stations 11a to 11n.

The wireless units 8a to 8n of the wireless base stations 11a to 11n are each composed of a modem unit and a detection unit, neither of which are depicted. Consequently, downlink packets transmitted from the downlink packet generation unit 166 of the communication control station 10 are modulated in the wireless base stations 11a to 11n and transmitted to the in-vehicle stations 2a to 2m, and uplink packets transmitted from the in-vehicle stations 2a to 2m are demodulated and detected, and sent to the FEC decoding units 6a to 6n.

The format of the packets depends on which slot they are used in. The uplink packets include at least a unique word, an information data string, and bit error detection code for detecting bit error in the information data string. Part of the information data string includes terminal identification code for specifying, in the base station 1, the in-vehicle station that is the communication counterpart. The bit error detection code is, for example, CRC code or BCH code which enables the correction of errors in the information data string. CRC code is used in the present embodiment.

FEC Decoding Units

The FEC decoding units 6a to 6b first examine whether unique words are included in data strings 21a to 21n detected by the wireless base stations 11a to 11n respectively, then perform error detection using the CRC code included in the detected data strings of branches detected to include unique words, and output error detection results 22a to 22n and decoded data strings 23a to 23n to the normal branch extraction unit 15. The FEC decoding units that did not detect unique words do not output a decoded data string 23, but rather output an error detection result 22 indicating error to the normal branch extraction unit 15. Given that error detection is performed using CRC code in the present embodiment, the error detection results 22a to 22n each have a value indicating the absence or presence of error.

Normal Branch Extraction Unit

The normal branch extraction unit 15 judges, based on the error detection results 22a to 22n, which branches were normally received without error (hereinafter, referred to as normal branches), and outputs only the normal branches from among the decoded data strings 23a to 23n to the data processing unit 16 as output data strings 24a to 24k (k≦n: k, n are integers).

Branch Selection/Combining Unit

In accordance with the control of a MAC control unit 162 in the data processing unit 16, the branch selection/combining unit 151 selects the decoded data strings in any of the branches in the uplink slots, and temporarily stores the selected decoded data strings in a reception data buffer 163 in the data processing unit. Details of such operations are described later.

Data Processing Unit

Next, the data processing unit 16 is composed of ID identification units 25a to 25k, an ID processing unit 161, the reception data buffer 163, a transmission data buffer 165, a downlink packet generation unit 166, an upper layer 164, and the MAC control unit 162.

The ID identification units 25a to 25k identify terminal ID numbers included in the output data strings 24a to 24k from the normal branch extraction unit 15.

If two or more different terminal ID numbers are identified by the ID identification units 25A to 25k, the ID processing unit 161 treats the output data strings that include the identified terminal ID numbers as valid, and notifies the valid output data strings to the MAC control unit 162. Note that if there are two or more output data strings that include the same terminal ID number, the ID processing unit 161 judges such output data strings to be the same data string.

The reception data buffer 163 temporarily stores the decoded data strings selected by the branch selection/combining unit 151.

The upper layer 164 is an application that processes reception data, collects messages from in-vehicle stations, and generates instructions for the in-vehicle stations and other necessary messages as transmission data.

The downlink packet generation unit 166 stores the transmission data in payloads to generate packets.

The MAC control unit 162 controls the branch selection/combining unit 151, the ID processing unit 161, the downlink packet generation unit 166 and the like in order to set basic frames as repeated units and appropriately assign in-vehicle stations to uplink and downlink communication slots. Note that in FIG. 2, con1 is a control signal for controlling the ID processing unit 161, and con2 is a control signal for controlling the branch selection/combining unit 151. Details of such control are shown in the flowcharts of FIG. 5 to FIG. 8, which are described later.

Basic Frame for Communication

Figure 3A:
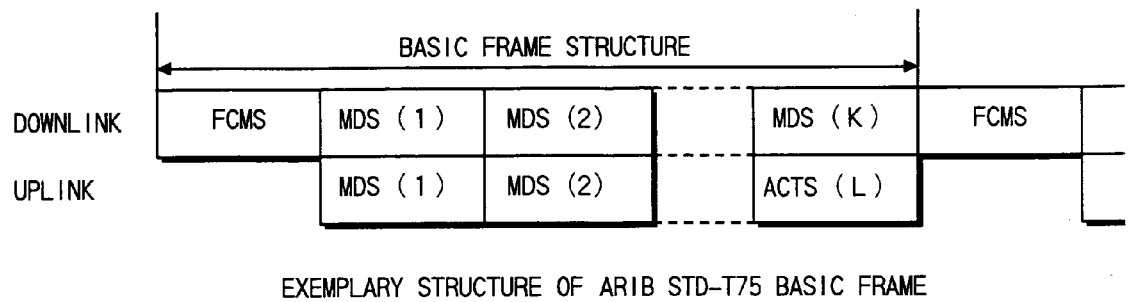
FIGS. 3A to 3C show an exemplary structure of a TDMA frame compliant with ARIB STD-T75 standards.
Figure 3B:
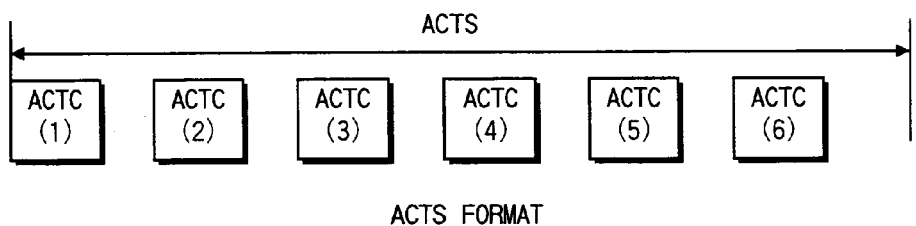

FIGS. 3A and 3B show a basic frame employed in communication between the base station and the terminal stations in the aforementioned communication system. The basic frame is structured as a full-duplex TDMA (Time Division Multiple Access) frame, and FIG. 3 shows an example in which a frame specified according to ARIB STD-T75 standards has been applied to DSRC (Dedicated Short-Range Communication) system.

As shown in FIG. 3A, a downlink in the DSRC system TDMA frame is composed of a frame control message slot (FCMS) for frame control, and two or more message data slots (MDS) for data transmissions, while an uplink in the DSRC system TDMA frame is composed of two or more message data slots (MDS) and an activation slot (ACTS) for registering an in-vehicle station in the communication link of the base station.

FCMS

The FCMS is a control slot assigned only in downlinks, and is always at the head of a TDMA frame. The base station uses the FCMS to transmit a frame control message channel (FCMC) that includes multiplexed frame structure information such as the wireless frequency at which the base station is operating, the frame cycle, and the position of a slot assigned to an in-vehicle station for which transmission has been permitted. The in-vehicle station receives the FCMC, establishes the frame cycle, and identifies the frame structure.

ACTS

The ACTS is a slot assigned only in uplinks, and as shown in FIG. 3B, two or more activation channel (ACTC) send windows for requesting a link with the base station are assigned before communication with the base station begins. The in-vehicle station randomly selects one of the windows, and uses the ACTS to transmit the ACTC. The base station receives the transmitted ACTC, assigns, to the in-vehicle station that requested the link, any communication slot (MDS) for data transmission from the next frame on, and uses the control slot (FCMS) to transmit an FCMC including multiplexed information regarding the communication slot assignment. The in-vehicle stations receives the FCMC, identifies the assigned communication slot (MDS), uses the assigned uplink communication slot (MDS) to transmit a data message channel (MDC) for performing road-to-vehicle data transmissions, and uses the assigned downlink communication slot to return an acknowledgment channel (ACKC) as a confirmation of MDC reception. Note that the two terms "slot" and "channel" used in the above description are defined as follows. A "slot" is a concept defined as a smallest unit of time division of a TDMA frame, and a "channel" is a concept defined as a communication path secured in a slot.

Figure 3C:
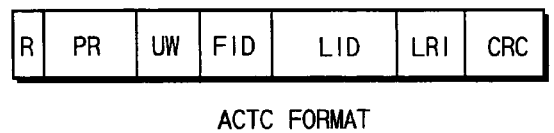

As shown in FIG. 3C, the aforementioned ACTC is composed of a ramp bit (R); a preamble (PR) for bit synchronization; a unique word (UW) for detecting the beginning of the information data in the ACTC; information data composed of an identification number FID of the base station, a link address ID (LID) for identifying a terminal (in-vehicle station), and link request information (LRI) including information such as the priority of the link request; and CRC code for detecting whether there is error in the information data.

Figure 4A:
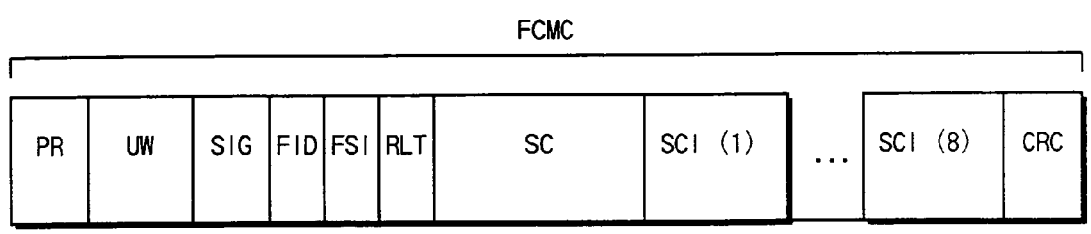
FIGS. 4A and 4B show an exemplary structure of a TDMA frame compliant with ARIB STD-T75 standards.
Figure 4B:
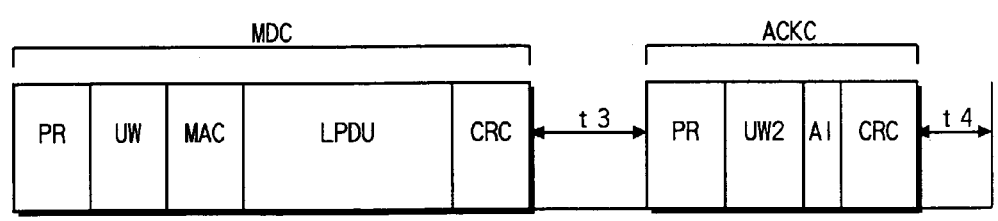

Note that although not relevant to the subject matter of the present invention, FIG. 4A shows a format of the control slot FCMS, and FIG. 4B shows a format of the communication slot MDS. Note that in the FCMC packet shown in FIG. 4A, PR indicates a preamble, UW indicates a unique word, SIG indicates a transmission channel control field, FID indicates a identification number field, FSI indicates a frame structure information field, RLT indicates a release timer information field, SC indicates a service application information field, and SCI(1) to SCI(8) indicate slot control information fields. Also, in FIG. 4B, MAC indicates a MAC control field, MDC indicates a message data channel for data transmission, ACKC indicates an ACK channel for notifying the transmission source whether reception was performed properly, and t3 and t4 indicate guard times. Also, the reference characters in FIG. 4B that are the same as in FIG. 4A indicate the same content.

Figure 5:
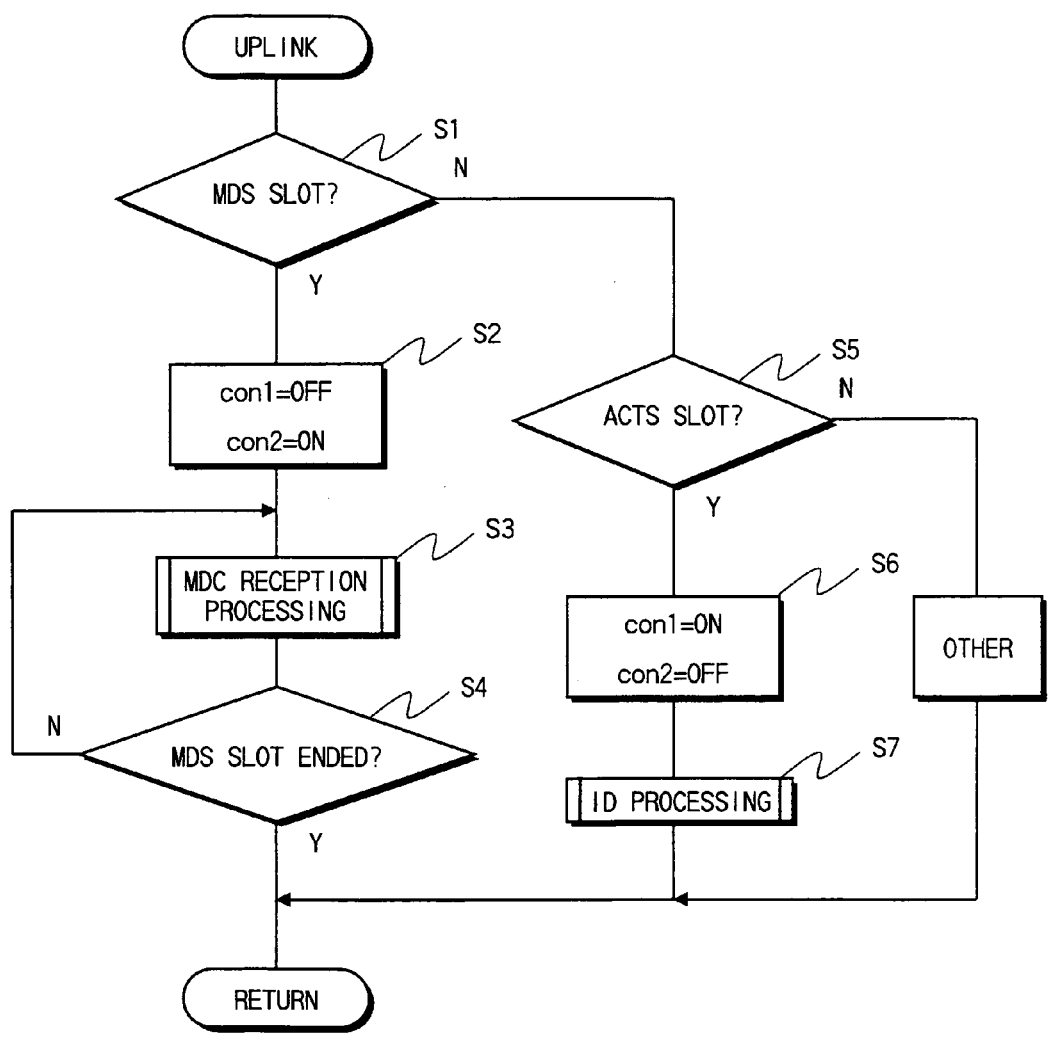
FIG. 5 is a flowchart showing uplink control.
Figure 6:
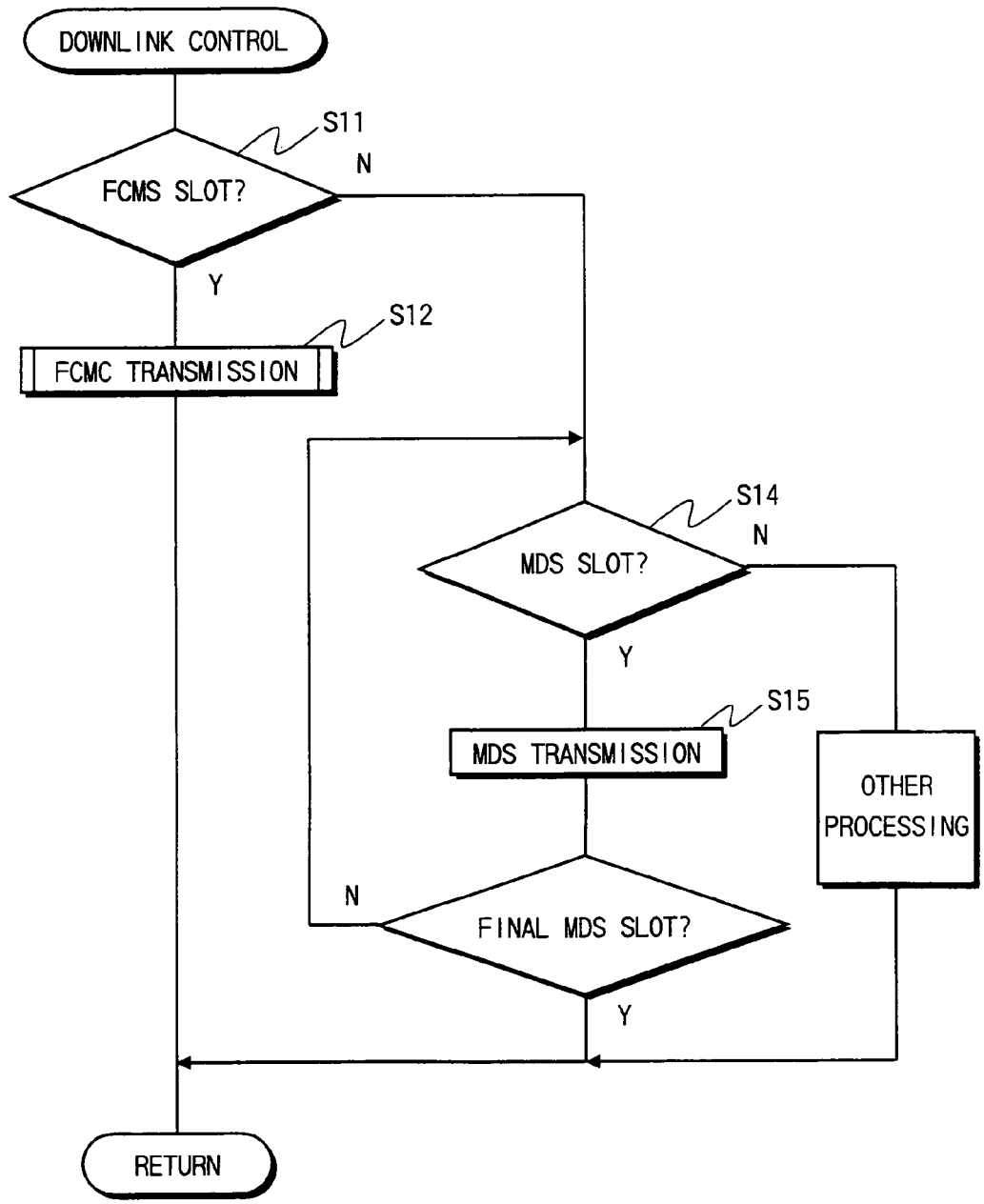
FIG. 6 is a flowchart showing downlink control.

Next is a description of operations performed in the wireless system, with reference to the flowcharts of FIG. 5 and FIG. 6.

FIG. 5 shows operations performed in slots in a basic frame in an uplink, and FIG. 6 shows operations performed in slots in a basic frame in a downlink.

In the present embodiment, uplink processing and downlink processing are performed in parallel since a full-duplex communication system is used.

Communication Operations

The base station 1 is aware in advance of the timing of the FCMS, MDS, and ACTS, since it determines the structure of the basic frame. The base station 1 therefore judges at all times during an uplink whether it is currently an MDS (S1) or an ACTS (S5), and performs necessary processing (S2 to S4, or S6 and S7) according to the slot. During a downlink, the base station 1 performs necessary processing (S12 and S13, or S15 to S17) depending on whether it is currently an FCMS (S11) or an MDS (S14).

Figure 7:
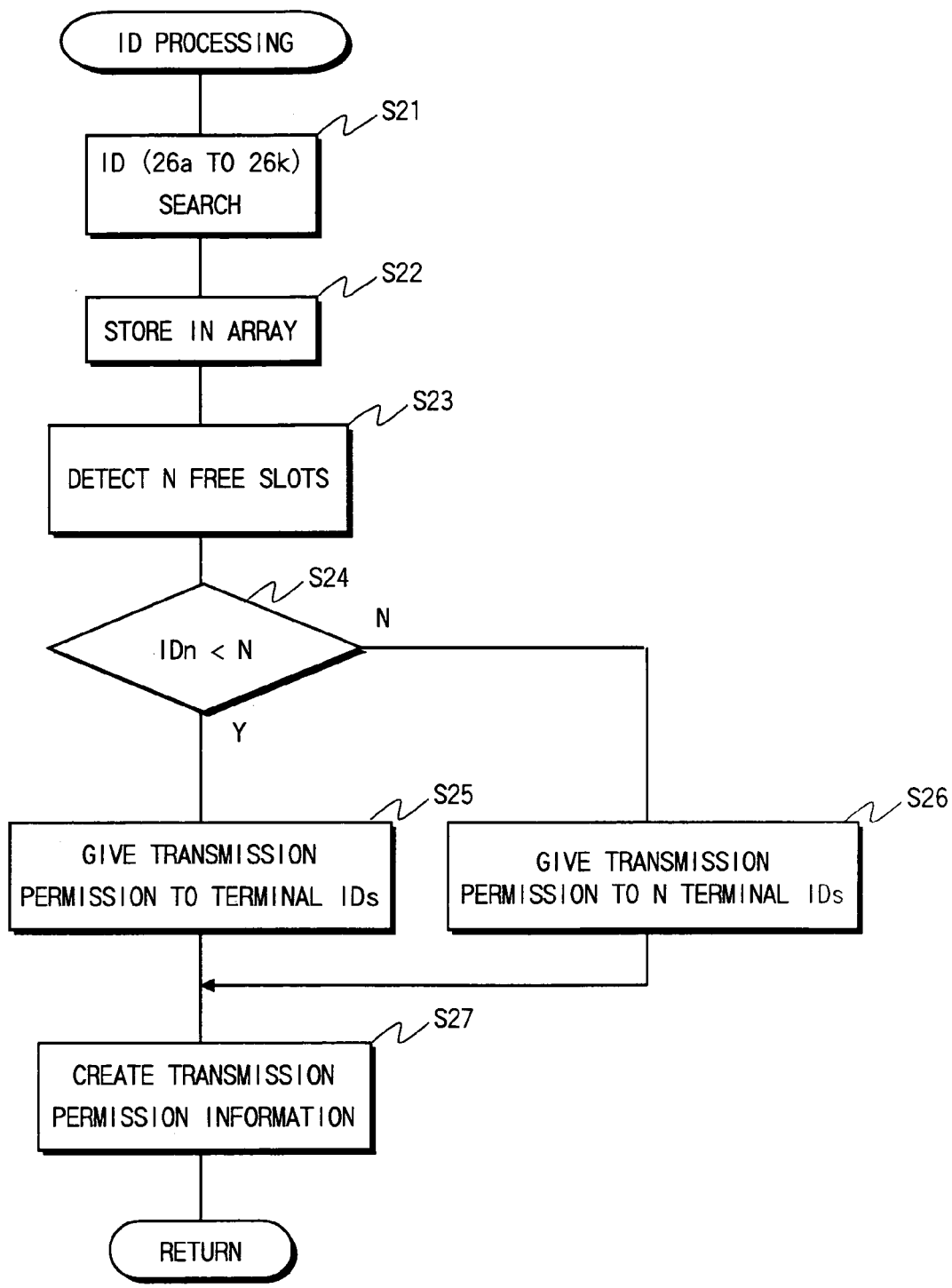
FIG. 7 is a flowchart describing operations of an ID processing unit.
Figure 8:
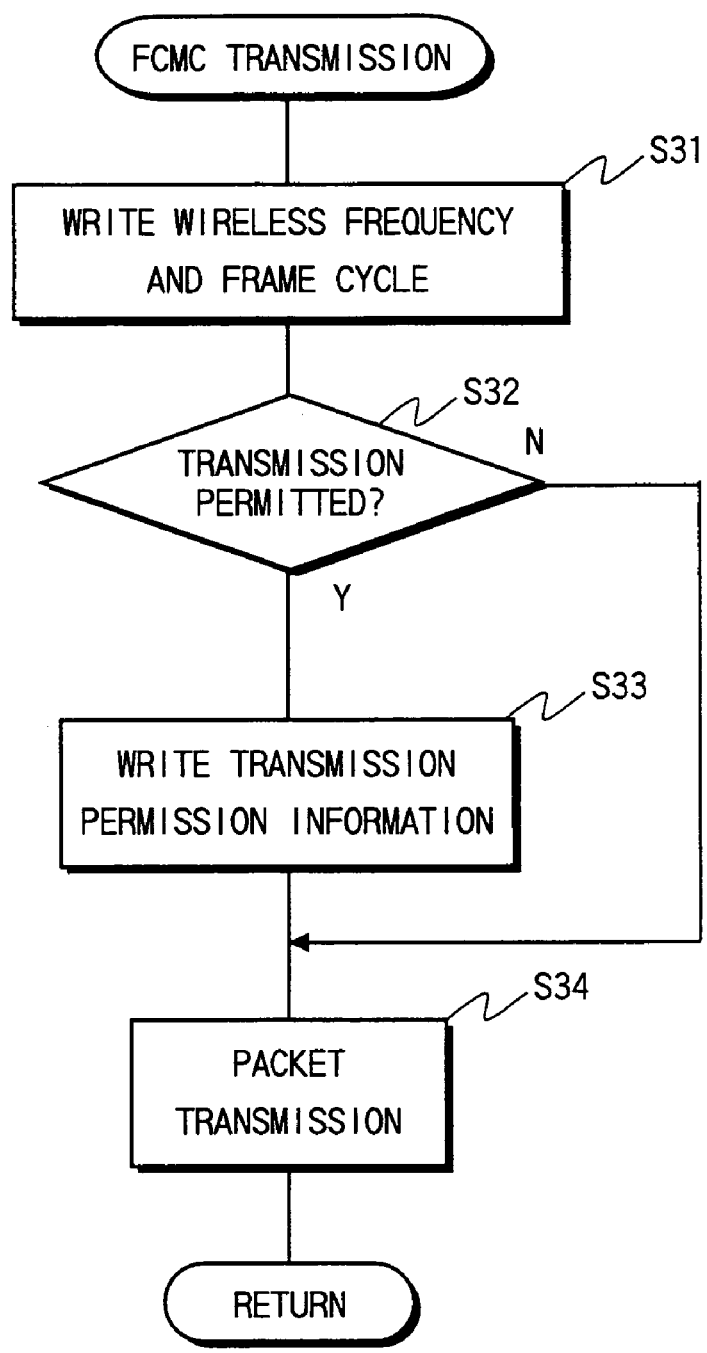
FIG. 8 is a flowchart showing FCMC transmission operations.
Figure 9:
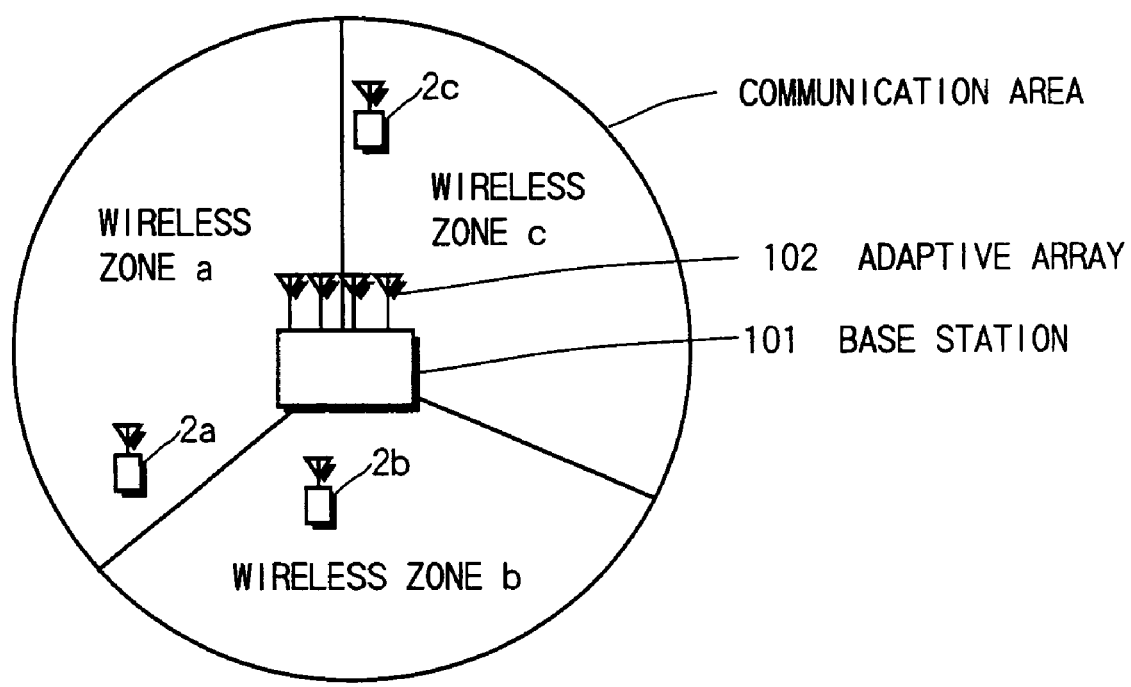
FIG. 9 shows an exemplary structure of a conventional wireless communication system.
Figure 10:
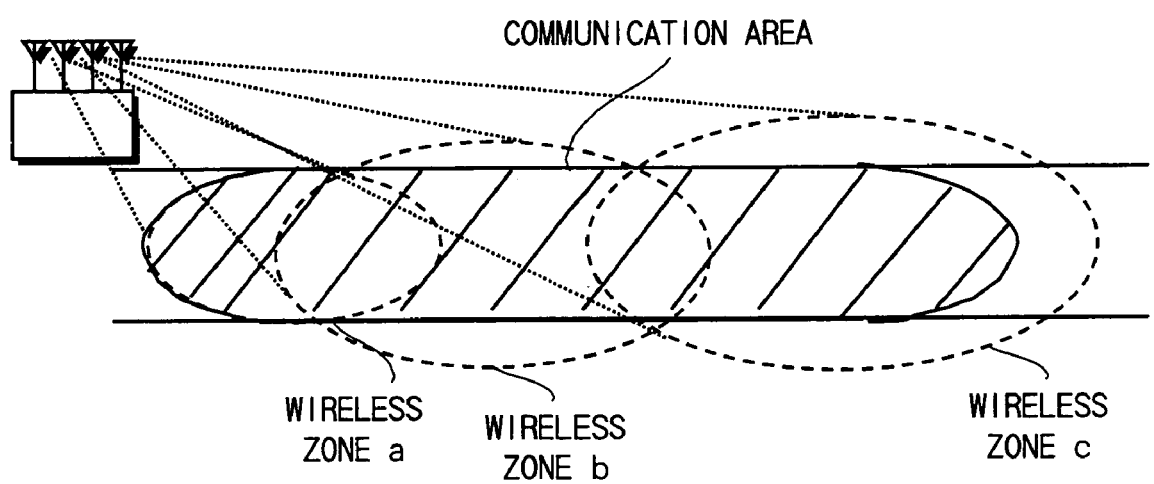
FIG. 10 illustrates a problem with conventional wireless communication systems.

The following describes a case in which no communication is being performed with any in-vehicle station, and then one of the in-vehicle stations sends a transmission request in an ACTS. When the ACTS commences (S5), the MAC control unit 162 sets the control signal con1 to "on" and the control signal con2 to "off" (S6). Setting con1 to "on" causes the ID processing unit 161 to commence processing (S7). As shown in FIG. 7, the processing of the ID processing unit 161 includes searching for IDs 26a to 26k identified by the ID identification units 25a to 25k (S21), and storing the found IDs in order in a transmission permission array (S22).

The search processing specifically involves identifying the FIDs, LIDs and LRIs included in the output data strings 24a to 24k, and storing, in the array as valid LIDs, all of the non-same LIDs in the output data strings 24a to 24k that include the same FID as the FID of the base station that was multiplexed in the transmitted FCMC. The transmission permission array is provided in advance in a memory, register, or the like, which is not depicted.

At the same time, the MAC control unit 162 detects N, which is the number of free MDS slots (S23). The MAC control unit 162 compares N (the number of free slots) and LIDn, which is the number of found LIDs (S24), and assigns slots (performs transmission permission) using N, the number of free slots, as the upper limit (S25 and S26). Thereafter, the MAC control unit 162 creates transmission permission information that includes slot assignment information (S27). The transmission permission information is sent from the MAC control unit 162 to the downlink packet generation unit 166 (see FIG. 2).

Note that although not shown in the flowchart, if LIDn (the number of in-vehicle stations performing transmission requests) is greater than the N free slots, the in-vehicle station that exceeds the number of free slots is not assigned a slot, but rather enters a free-slot wait state. A slot is then assigned when it becomes free. If two or more in-vehicle stations are in the free-slot wait state, a free slot is assigned to one of the in-vehicle stations when it becomes available, and this is repeated until there are no longer any idle in-vehicle stations.

In this way, during the ACTS, the data received by the wireless base stations 11a to 11n is decoded by the FEC decoding units 6a to 6n respectively, and the normal branch extraction unit 15 outputs, as the output data strings 24a to 24k, all of the data judged to be received normally based on error detection results, and the in-vehicle station IDs are detected. In other words, during the ACTS, none of the transmission requests that are from different in-vehicle stations and have been received by the antennas 9a to 9n are ignored, but rather all are detected and decoded, and further, all are notified to the MAC control unit 162 as long as they have been determined by error detection to have been normally received. Slots are assigned to all of the in-vehicle stations that have performed transmission requests, unless an MDS slot cannot be assigned due to an insufficient number of free slots.

Since the ACTS comes at the end of the basic frame, the MAC control unit 162 uses the FCMS in the next new basic frame to transmit transmission permission information created based on transmission requests received from all of the in-vehicle stations in the ACTS. The following describes operations of the downlink processing shown in FIG. 6.

The FCMC is transmitted (S12) when the FCMS begins (S11). The transmission information of the FCMC is created in accordance with the subroutine shown in FIG. 8. First, information such as the frame cycle and wireless frequency at which the base station is operating is written to the payload of the packet (S31), and it is judged whether transmission permission information is present (S32). Since there is transmission permission information in this case, the transmission permission information is also written to the packet payload (S33), and the packet is transmitted (S34).

The writing of the transmission information specifically involves inserting, in order from highest priority, the LIDs stored in the array into a slot control information (SCI) field, in the FCMC, for the assignment of communication slots. Note that the assignment priorities may be determined by, for example, giving highest priority when a priority assignment bit included in an LRI is "1", and randomly assigning priorities to two or more priority assignment bits that have the same value.

The FCMC is transmitted from the downlink packet generation unit 166 directly to all of the wireless base stations 11a to 11n via path L (see FIG. 2). FCMC transmission (S12) is therefore performed via all of the antennas 9a to 9n at the same time. All of the in-vehicle stations receive the FCMC in any of the wireless zones created by the antennas, identify their assigned MDS, and use the assigned MDS to exchange message data with the base station 1.

When the MDS begins (S14) after the FCMS, MDC transmission is performed per assigned slot sequentially (S15).

An in-vehicle station that has been given transmission permission uses the information in the aforementioned FCMS to identify in which slot to perform communication, and transmits a message in the assigned MDS in the following uplink. Meanwhile, during uplink control, the MAC control unit 162 on the base station side detects when an MDS begins (S1), and then sets the control signal con1 to "off" and the control signal con2 to "on" (S2), and receives an MDS from the in-vehicle station (S3).

Setting the control signal con1 to "off" causes the ID processing unit 161 to stop performing output, whereby information pertaining to identified IDs is no longer output. On the other hand, since the control signal con2 is set to "on", the branch selection/combining unit 151 performs diversity operations, and similarly to the conventional method of document 2, selects, from among the packets received by the antennas, a packet whose error correction code block has the least errors per block, and stores the selected packet in the reception data buffer 163.

Summary

As described above, in the wireless transmission system of the present invention, the wireless base stations 11a to 11n focus the directivity of the antennas 9a to 9n to form the wireless zones a to n, such that even if ACTCs from in-vehicle stations in different wireless zones are received at the same time in the same ACTC window (e.g., ACTC (1) in FIG. 3B), collisions between the signals transmitted from the different in-vehicle stations are avoided, and the ACTCs from the in-vehicle stations can be normally received by the antennas 9a to 9n. Here, the base station 1 performs the aforementioned processing to store the LIDs of the in-vehicle stations at the same time, and if there are two or more assignable MDSes, assign an MDS to each of the in-vehicle stations corresponding to the LIDs in a single instance.

Therefore, applying the present invention to a dedicated short range communication (DSRC) system conforming to ARIB STD-T75 standards enables improving efficiency in the use of frequency by reducing the number of occurrences of unused communication slots.

Note that communication by the contention method is not performed in time slots other than the aforementioned ACTS. Therefore, during the time slot of an MDS, the base station uses the conventional method of document 2 to perform so-called diversity processing for selecting or combining signals received by a single antenna or by two or more antennas, and processing the signals as a single bundle of information.

Also, although the wireless base stations 11a to 11b of the base station 1 include wireless unit 8a to 8n in the above embodiment, the wireless units and the FEC decoding units may be provided on either the wireless base station side or the communication control side.

Moreover, although the above embodiment describes a case in which the wireless zones formed by the wireless base stations are overlapped to form communication areas along a one-dimensional line, as the wireless communication system to which the present invention is applied, the present invention can be applied even when forming a communication area with wireless zones in spots that do not overlap, or forming a communication area in a two-dimensional plane or a three-dimensional space.

Also, although the communication slots are time slots in a system that uses TDMA in the above embodiment, the present invention is applicable even if the communication slots are frequency channels in a system that uses FDMA.

Moreover, although a road-to-vehicle communication system has been described as an example of the wireless communication system to which the present invention is applied, the present invention is not limited to a road-to-vehicle communication system. The present invention is also applicable to, for example, a mobile communication system for performing communication between a base station and mobile terminals.

Lastly, part or all of the constituent elements of the communication control station 10 of the above embodiment can be incorporated on a single integrated chip (IC).

INDUSTRIAL APPLICABILITY

A wireless communication system of the present invention is useful in a system in which a base station and terminal stations perform wireless communication using a contention method such as slotted Aloha.

The invention claimed is:

1. A wireless communication system for performing communication between a base station and a plurality of terminal stations by using a contention method to assign a different slot in response to a transmission request from each of the terminal stations, the base station comprising:

a plurality of antennas disposed such that a plurality of wireless zones cover mutually different areas;

a plurality of wireless units connected to the plurality of antennas in one-to-one correspondence, and being operable to, via the respective antennas, receive wireless signals from the terminal stations in the wireless zones, and transmit wireless signals to the terminal stations in the wireless zones;

a data processing unit operable to process the wireless signals received by the plurality of wireless units, as well as generate data to be transmitted to the plurality of terminal stations; and a communication control unit operable to control the plurality of wireless units so as to, during a slot other than a transmission request slot, form one communication area combining the wireless zones of all of the antennas, and during the transmission request slot, form a plurality of mutually independent communication areas less than or equal in number to the plurality of antennas.

2. The wireless communication system of claim 1, wherein during the transmission request slot, the wireless zones of the antennas each form a single independent communication area.

3. The wireless communication system of claim 1, wherein the data processing unit includes a judgment subunit operable to, if a plurality of the transmission requests are received from a plurality of terminal stations at substantially the same time during the transmission request slot, judge whether the plurality of transmission requests have been normally received; and a permission information generation subunit operable to, if the judgment subunit has judged that the plurality of transmission requests have been normally received, generate transmission permission information addressed to the plurality of terminal stations, and the transmission permission information is transmitted in a downlink control slot assigned by the base station.

4. The wireless communication system of claim 1, wherein if a plurality of communication slots are available, the base station assigns each of the communication slots to a different one of the plurality of terminal stations, and transmits, to the plurality of terminal stations, transmission permission information regarding the assignment of the communication slots.

5. The wireless communication system of claim 3, wherein the data processing unit includes a plurality of decoding subunits equal in number to the plurality of wireless units, each of the decoding subunits being operable to decode a signal received by a different one of the wireless units, and during the transmission request slot, the judging subunit references the signals decoded by the plurality of decoding units to judge whether each of the wireless units normally received the respective signal.

6. The wireless communication system of claim 4, wherein each of the terminal stations transmits data in the respective communication slot assigned according to the transmission permission information, and the base station performs data reception by receiving the data via the communication slots and performing selection/combining with respect to a plurality of decoded data strings resulting from the plurality of decoding units decoding the received data.

7. The wireless communication system of claim 6, wherein the selection/combining selects a single data string according to error information of the plurality of decoded data strings.

8. The wireless communication system of claim 4, wherein the plurality of communication slots are frequency channels in a wireless communication system using an FDMA method, or time slots in a wireless communication using a TDMA method.

9. The wireless communication system of claim 1, wherein part or all of the plurality of wireless units, the data processing unit and the communication control unit have been incorporated on a single chip.

10. A communication method in a wireless communication system for performing communication between a base station and a plurality of terminal stations by using a contention method to assign a different slot in response to a transmission request from each of the terminal stations, the base station including:

a plurality of antennas disposed such that a plurality of wireless zones cover mutually different areas;

a plurality of wireless units connected to the plurality of antennas in one-to-one correspondence, and being operable to, via the respective antennas, receive wireless signals from the terminal stations in the wireless zones, and transmit wireless signals to the terminal stations in the wireless zones;

a data processing unit operable to process the wireless signals received by the plurality of wireless units, as well as generate data to be transmitted to the plurality of terminal stations; and a control unit operable to control connections between the data processing unit and the plurality of wireless units, and switch between (i) an independent zone mode of causing the wireless zones of the antennas to be independent communication areas and (ii) a combined zone mode of forming a single communication area by combining all of the wireless zones, wherein in a transmission request slot, the independent zone mode is set, and transmission requests from the plurality of terminal stations are received concurrently, and in a slot other than the transmission request slot, the combined zone mode is set, and one of the plurality of terminal stations performs communication with use of the slot other than the transmission request slot.

* * * * *